US009834196B2

(12) United States Patent
Morisaki (10) Patent No.: US 9,834,196 B2
(45) Date of Patent: Dec. 5, 2017

(54) VEHICULAR INFORMATION-PROCESSING DEVICE (71) Applicant: TOYOTA JIDOSHA KABUSHIKI KAISHA, Toyota-shi, Aichi-ken (JP)

(72) Inventor: Keisuke Morisaki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 12 days.

(21) Appl. No.: 14/826,456

(22) Filed: Aug. 14, 2015

(65) Prior Publication Data
US 2016/0101774 A1 Apr. 14, 2016

(30) Foreign Application Priority Data

Oct. 14, 2014 (JP) .................. 2014-209792

(51) Int. Cl.
*B60W 30/188* (2012.01)
*G01C 21/34* (2006.01)
*B60W 40/12* (2012.01)
*B60W 20/12* (2016.01)
*B60W 50/00* (2006.01)
*B60W 50/14* (2012.01)
*B60W 50/08* (2012.01)
*B60W 10/06* (2006.01)
*B60W 10/08* (2006.01)

(52) U.S. Cl.
CPC ............ *B60W 20/12* (2016.01); *B60W 10/06* (2013.01); *B60W 10/08* (2013.01); *B60W 50/0097* (2013.01); *B60W 50/082* (2013.01); *B60W 50/14* (2013.01); *G01C 21/3469* (2013.01); *B60W 2050/146* (2013.01); *B60W 2510/244* (2013.01); *B60W 2550/402* (2013.01); *Y02T 10/6269* (2013.01); *Y02T 10/6291* (2013.01); *Y02T 10/84* (2013.01)

(58) Field of Classification Search
USPC ............................................ 701/22
See application file for complete search history.

(56) References Cited

U.S. PATENT DOCUMENTS 5,557,254 A * 9/1996 Johnson ............... B60R 25/102
340/426.19
5,596,262 A * 1/1997 Boll .................. B60L 11/12
320/DIG. 21
8,725,330 B2 * 5/2014 Failing ............... B60L 3/00
701/22

(Continued)

FOREIGN PATENT DOCUMENTS

JP 2007-050888 A 3/2007
JP 2009-012605 A 1/2009

(Continued)

Primary Examiner — Jean-Paul Cass
(74) Attorney, Agent, or Firm — Oliff PLC (57) ABSTRACT

In the first mode, a controller circuitry restrains or prohibits operation of an internal combustion engine. In the second mode, the controller circuitry activates maintains the charge amount of the battery. A controller circuitry generates a travel plan assigns one of the first mode and the second mode to each of sections, which are included in the travel route. An assessing circuitry assesses a tendency of assignment of the first mode in the travel route. A notifying device notifies information corresponding to the tendency assessed by the assessing circuitry.

6 Claims, 4 Drawing Sheets

(56) References Cited

U.S. PATENT DOCUMENTS

| | | | |
|---|---|---|---|
| 8,823,507 B1* | 9/2014 | Touloumtzis | H04L 67/24 340/501 |
| 8,831,807 B2* | 9/2014 | Dehmann | B60R 16/0236 701/22 |
| 9,469,210 B2* | 10/2016 | Ono | B60L 11/1814 |
| 2001/0039230 A1* | 11/2001 | Severinsky | B60H 1/004 477/3 |
| 2004/0168094 A1* | 8/2004 | Chen | G06F 1/26 713/300 |
| 2006/0020381 A1* | 1/2006 | Czubay | B60R 16/0373 701/36 |
| 2006/0028167 A1* | 2/2006 | Czubay | B60K 6/48 320/104 |
| 2007/0068714 A1* | 3/2007 | Bender | B60W 20/10 180/65.29 |
| 2008/0029318 A1* | 2/2008 | Proietty | B60K 6/48 180/65.265 |
| 2008/0077311 A1* | 3/2008 | Gauthier | B60T 7/22 701/117 |
| 2008/0270016 A1* | 10/2008 | Proietty | G01C 21/3469 701/123 |
| 2009/0043467 A1* | 2/2009 | Filev | B60W 20/15 701/57 |
| 2010/0145559 A1* | 6/2010 | Gauthier | B60K 6/445 701/22 |
| 2010/0241339 A1* | 9/2010 | Proietty | F02D 41/1445 701/109 |
| 2012/0010769 A1* | 1/2012 | Sourioux | B60K 6/48 701/22 |
| 2012/0046814 A1* | 2/2012 | Sugimoto | B60K 6/445 701/22 |
| 2012/0285421 A1* | 11/2012 | Cunningham | B60T 17/02 123/436 |
| 2013/0018538 A1 | 1/2013 | Miura et al. | |
| 2013/0249682 A1* | 9/2013 | Van Wiemeersch | B60R 25/1004 340/426.24 |
| 2013/0332015 A1* | 12/2013 | Dextreit | B60K 6/448 701/22 |
| 2014/0184141 A1* | 7/2014 | Loftus | B60L 11/1818 320/104 |
| 2014/0277872 A1* | 9/2014 | MacNeille | G01C 21/3415 701/22 |
| 2014/0278104 A1* | 9/2014 | Proietty | G01C 21/3438 701/537 |
| 2014/0288743 A1 | 9/2014 | Hokoi et al. | |
| 2015/0052987 A1* | 2/2015 | Jung | B60W 10/00 73/114.53 |
| 2015/0066258 A1* | 3/2015 | Loftus | B60L 11/1838 701/22 |
| 2015/0115886 A1* | 4/2015 | Loftus | B60L 11/1816 320/109 |
| 2015/0191178 A1* | 7/2015 | Roy | B60W 40/09 701/36 |
| 2015/0217656 A1* | 8/2015 | Loftus | H02J 7/0065 320/136 |
| 2015/0353098 A1* | 12/2015 | Percy | B60W 50/16 701/53 |
| 2016/0117947 A1* | 4/2016 | Misu | G09B 9/04 434/62 |
| 2016/0257294 A1* | 9/2016 | Morisaki | B60W 20/12 |
| 2017/0021768 A1* | 1/2017 | Jaegal | B60Q 9/008 |
| 2017/0072850 A1* | 3/2017 | Curtis | B60W 50/0097 |

FOREIGN PATENT DOCUMENTS

| | | |
|---|---|---|
| JP | 2015-030407 A | 2/2015 |
| WO | 2015/019142 A1 | 2/2015 |

* cited by examiner

VEHICULAR INFORMATION-PROCESSING DEVICE

BACKGROUND OF THE DISCLOSURE

The present disclosure relates to a vehicular information-processing device that processes information regarding application of a plurality of driving modes of a vehicle.

Conventionally, vehicles that use an internal combustion engine and a motor as drive sources have been widely known. Such vehicles include plug-in hybrid vehicles. Such a vehicle has, as driving modes, a CD mode (first mode), in which the charge amount of the battery is consumed, and a CS mode (second mode), in which the battery charge amount is maintained. In the CD mode, for example, priority is given to EV driving, in which the engine is stopped and only the motor is used. That is, use of the engine is restrained or prohibited. In the CS mode, priority is given to HV driving, in which at least one of the engine and the motor is used as necessary to maintain the charge amount of the battery.

In recent years, vehicular information-processing devices have been proposed that calculates a travel route from a departure place to a destination and assigns, as a vehicle driving mode, the first mode or the second mode to each of the sections in the calculated travel route. For example, Japanese Laid-Open Patent Publication No. 2009-12605 discloses one example of the vehicular control device that has such an information processing function for a vehicle.

The device of Japanese Laid-Open Patent Publication No. 2009-12605 applies the second mode as the mode for the section of the highest average vehicle speed among the sections in a travel route and applies the first mode as the mode for the remaining sections. The device also calculates a prediction value of the remaining battery level of the vehicle when the vehicle will have traveled from the current position to the destination with the applied modes. If the calculated prediction value is less than the lower limit value, which corresponds to depletion of the battery, the device changes the mode of the section of the second highest average vehicle speed from the first mode to the second mode and then re-calculates the prediction value of the remaining battery level at the destination. Thereafter, until the prediction value of the remaining battery level of the vehicle at the destination reaches the vicinity of the lower limit value, the device successively changes the mode of the section of the next highest average vehicle speed from the first mode to the second mode. When the prediction value of the remaining battery level at the destination reaches the vicinity of the lower limit value, the device makes a plan using the modes applied to the respective sections.

To improve the fuel efficiency, the device of Japanese Laid-Open Patent Publication No. 2009-12605 plans assignment of the modes to consume the battery by actively employing the motor to drive the vehicle in sections suitable for the EV driving in the travel route from the departure place to the destination. However, depending on the travel route, such planned assignment of the modes will not necessarily improve the fuel efficiency as expected. Further, the conventional device cannot even notify the user of such a possibility.

Accordingly, it is an objective of the present disclosure to provide a vehicular information-processing device that is capable of notifying a user of the actual magnitude of fuel efficiency improvement expected to be achieved through a travel plan.

SUMMARY

To achieve the foregoing objective and in accordance with one aspect of the present disclosure, a vehicular information-processing device, which processes information of a vehicle, is provided. A vehicular information-processing device, which processes information of a vehicle. The vehicular information-processing device comprising a controller circuitry configured to make the vehicle select one of a first mode and a second mode and travels. In the first mode, the controller circuitry configured to restrain or prohibit operation of an internal combustion engine, while prioritizing operation of a motor, which consumes a charge amount of a battery. In the second mode, the controller circuitry configured to activate at least one of the engine and the motor to maintain the charge amount of the battery. The controller circuitry configured to generate a travel route from a departure place to a destination including a plurality of sections. The controller circuitry configured to generate a travel plan assigns one of the first mode and the second mode to each of the sections, which are included in the travel route. The vehicular information-processing device further comprising: an assessing circuitry configured to assess a tendency of assignment of the first mode in the travel route; and a notifying device configured to notify information corresponding to the tendency assessed by the assessing circuitry.

This configuration assesses the tendency of assignment of the first mode in the travel route of the travel plan and notifies information corresponding to the assessed tendency of assignment of the first mode. Since the first mode is designed to improve the fuel efficiency of the vehicle, the tendency of assignment of the first mode corresponds to the magnitude of fuel efficiency improvement that will be achieved by traveling in accordance with the travel plan in comparison to the fuel efficiency of traveling not in accordance with the travel plan. The notification of the information corresponding to the tendency of assignment of the first mode allows the user to recognize the actual magnitude of fuel efficiency improvement that will be achieved by driving the vehicle in accordance with the travel plan. Since being made prior to the travel, such notification (guidance) permits the user to decide whether or not to drive the vehicle in accordance with the travel plan.

The notifying device is preferably configured to notify, as the information corresponding to the tendency, information indicating a magnitude of fuel efficiency improvement that will be achieved by the travel plan. This configuration allows the user to recognize the magnitude of fuel efficiency improvement that will be achieved if the vehicle is driven in accordance with the travel plan.

The notifying device is preferably configured to notify the information when the information corresponding to the tendency is information indicating that the magnitude of fuel efficiency improvement will be relatively small.

This configuration notifies the fact that the magnitude of fuel efficiency improvement will be relatively small in the travel route. This allows the driver to recognize the fact that driving the travel route in accordance with the travel plan will result in a small magnitude of fuel efficiency improvement.

The assessing circuitry is preferably configured to: calculate a sum of distances of all the sections to which the first mode is assigned in the travel route; convert the sum into a distance from the departure place; define the converted distance as an initial section; in the initial section from the departure place in the travel route, define the distance that is planned as the first mode as an initial distance; and define a ratio of the initial distance to the initial section as the tendency.

In a vehicle that can travel in the first mode, such as a plug in hybrid vehicle, the first mode is selected preferentially when there is no travel plan, and the vehicle is driven accordingly. Thus, the first mode tends to be selected in sections closer to the departure place in the travel route. Thus, if, in a travel plan, the first mode is assigned to a large number of sections closer to the departure place, it is evident that traveling in accordance with that travel plan will achieve a small magnitude of fuel efficiency improvement in comparison to traveling not in accordance with the travel plan. On the other hand, since the vehicle is driven with the first mode being preferentially selected when there is no travel plan, the charge amount of the battery is relatively quickly consumed. Thus, as the vehicle approaches the destination, the vehicle will be less likely to be capable of traveling in the first mode even in sections suitable for the first mode. In contrast, if, in accordance with a travel plan, the first mode is assigned to sections suitable for the first mode that include sections near the destination, it is evident that traveling in accordance with that travel plan will have a greater magnitude of fuel efficiency improvement than traveling not in accordance with the travel plan.

Thus, according to the above described configuration, the assessing circuitry assesses the ratio as the tendency of assignment of the first mode. This allows the actual magnitude of fuel efficiency improvement to be recognized accurately.

The notifying device is preferably configured to, when the ratio is assessed to be greater than or equal to a predetermined ratio, notify information corresponding to the tendency as the information indicating that the magnitude of fuel efficiency improvement will be relatively small.

With this configuration, the information indicating that the magnitude of fuel efficiency improvement will be relatively small is notified when the ratio of the distance to which the first mode is assigned in sections closer to the departure place is higher than or equal to the predetermined ratio.

The vehicular information-processing device preferably further includes a calculating circuitry, which is configured to calculate a travel distance that can be traveled in the first mode. The calculating circuitry is configured to calculate a travel distance that can be traveled in the first mode based on the charge amount of the battery and a predetermined road load. The assessing circuitry is configured to: calculate a sum of distances of all the sections to which the first mode is assigned in the travel route by the travel plan; define the sum as a total distance; and assess, as the tendency, a difference between the travel distance calculated by the calculating circuitry and the total distance.

With this configuration, the tendency of assignment of the first mode in the travel route of the travel plan is assessed based on the difference between the travel distance calculated by the calculating circuitry and the distance of all the sections to which the first mode is assigned in the travel route of the travel plan. In general, a travel distance that is calculated based on the charge amount of a battery and a predetermined road load without considering a travel route has a low accuracy. In contrast, it is evident that the total distance of all sections to which the first mode is assigned according to a travel plan, which is made by taking the travel route into consideration, has a high accuracy. Therefore, if the difference between the travel distance calculated by the calculating circuitry and the total distance of all the sections to which the first mode is assigned is small, the travel plan will achieve a small magnitude of fuel efficiency improvement. On the contrary, if the difference is great, the travel plan will achieve a great magnitude of fuel efficiency improvement. For example, the longer the total distance of the sections to which the first mode is assigned is in comparison to the calculated travel distance, the greater the magnitude of fuel efficiency improvement becomes. The closer to the calculated distance the total distance is, the smaller the magnitude of fuel efficiency improvement becomes.

The notifying device is preferably configured to, when the difference is assessed to be less than or equal to a predetermined threshold value, notify information corresponding to the tendency as the information indicating that the magnitude of fuel efficiency improvement will be relatively small.

With this configuration, the information indicating that the magnitude of fuel efficiency improvement will be relatively small is notified when the difference between the normal travel distance and the total distance of the sections to which the first mode is assigned is less than or equal to the predetermined threshold value.

The notifying device is preferably configured to, when the information is notified, notify information to decide whether to cause the vehicle to travel according to the travel plan.

This configuration permits the user to select whether or not to drive the vehicle in accordance with the travel plan based on the tendency of assignment of the first mode in the travel route. For example, if the notified information indicates a certain magnitude of fuel efficiency improvement, the user can make the selection based on the magnitude of fuel efficiency improvement. If the notified information indicates that the magnitude of fuel efficiency improvement will be relatively small, the user can more properly select whether to follow the travel plan.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DESCRIPTION OF THE PREFERRED EMBODIMENTS

A vehicular information-processing device according to a first embodiment will now be described with reference to FIGS. 1 to 4. The vehicular information-processing device of the present embodiment is mounted on a plug-in hybrid vehicle 100, which has an internal combustion engine 131 and an electric motor 140 as drive sources, and outputs driving assistance information.

The outline of the vehicle 100, which is equipped with the vehicular information-processing device, will now be described.

The vehicle 100 has two driving modes. One of the modes is a charge depleting (CD) mode, which is a first mode and consumes the charge amount of a battery 113. The other mode is a charge sustaining (CS) mode, which is a second mode and maintains the charge amount of a battery 113. In the CD mode, for example, priority is given to EV driving, in which the engine 131 is stopped and only the motor 140 is used, so that use of the engine 131 is restrained to consume the charge amount of the battery 113. In the CS mode, priority is given to HV driving, in which at least one of the engine 131 and the motor 140 is used to maintain the charge amount of the battery 113, so that the charge amount of the battery 113 is maintained. A navigation system 120 of the vehicle 100 sets a travel route from a departure place of the vehicle 100 to a destination when the destination is set. A travel assisting section 150, which is an assessing section of a hybrid system controller 110, assigns the CD mode or the CS mode to respective sections in the set travel route, thereby making a travel plan. Normally, although varying in the magnitude, a travel plan achieves a certain fuel efficiency improvement in comparison to traveling not in accordance with a travel plan. The magnitude of fuel efficiency improvement is assessed to be greater as the fuel efficiency in traveling in accordance with a travel plan becomes higher than the fuel efficiency of traveling not in accordance with the travel plan. Also, the magnitude of fuel efficiency improvement is assessed to be smaller as the fuel efficiency in traveling in accordance with a travel plan becomes closer to the fuel efficiency of traveling not in accordance with the travel plan. The travel assisting section 150 outputs, to a human machine interface (HMI) 123, which is a notifying device, information indicating that the magnitude of fuel efficiency improvement is relatively small, that is, information indicating that the effect on the fuel consumption corresponding to the tendency of assignment of the CD mode in the planned travel plan is relatively small. The HMI 123 displays on its screen the information indicating that the magnitude of fuel efficiency improvement is relatively small (refer to FIG. 4). This allows the user to select whether or not to travel in accordance with the travel plan. The travel assisting section 150 may be composed of circuitry.

The detailed configuration of the present embodiment will now be described.

Figure 1:
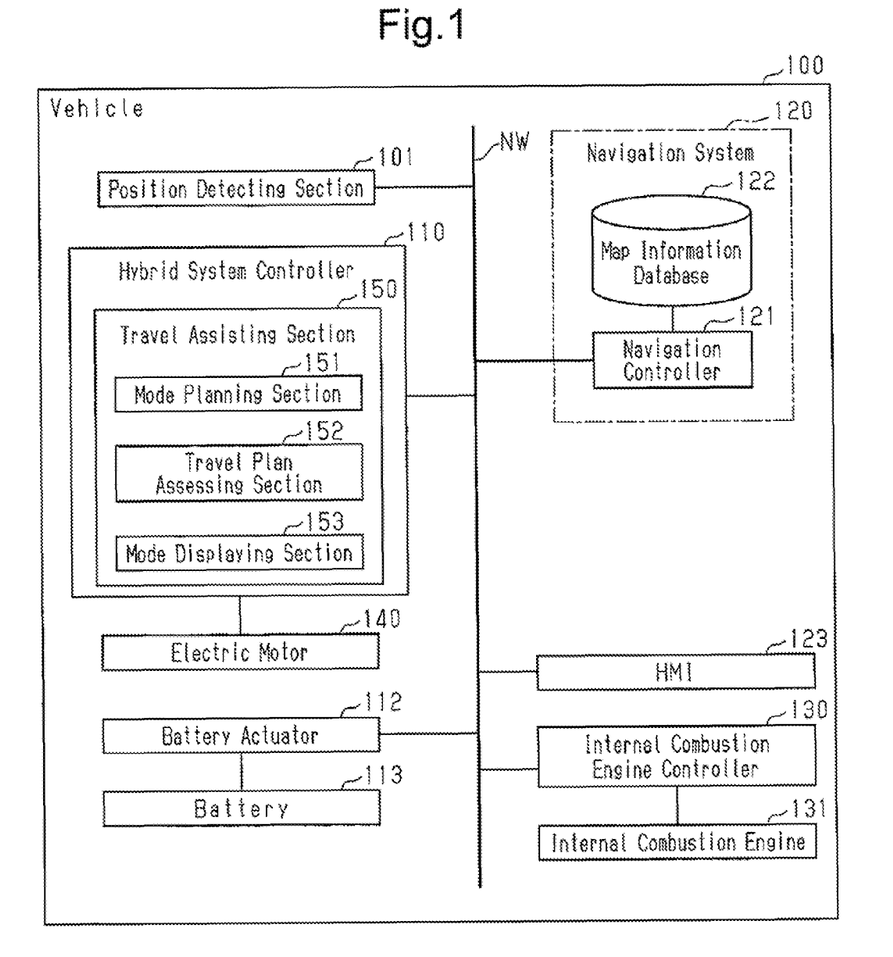
FIG. 1 is a block diagram schematically showing a vehicular information-processing device according to a first embodiment of the present disclosure.

As shown in FIG. 1, the vehicle 100, on which the vehicular information-processing device is mounted, includes a position detecting section 101 as an element for obtaining information regarding the state of the vehicle 100. Such elements are connected to various types of controllers such as an engine controller 130, the hybrid system controller 110, and a navigation controller 121 via an on-vehicle network NW such as a control area network (CAN). The engine controller 130 controls operation of the engine 131, and the hybrid system controller 110 controls operation of the motor 140. The controllers are electronic control units (ECU) each including a small computer having a calculator and a memory. The controllers are capable of performing various types of control through calculations by the calculators using the programs and parameters stored in the memories.

The position detecting section 101 detects the current position of the vehicle 100. The position detecting section 101 includes, for example, a global positioning system (GPS). The GPS receives GPS satellite signals and identifies the current position of the vehicle 100 based on the received GPS satellite signals. The position detecting section 101 outputs information indicating the identified current position, which is, for example, information including the latitude and longitude. In addition to or in place of GPS satellite signals, the position detecting section 101 may use other satellite signals or road-to-vehicle communication to detect the current position of the vehicle 100.

The vehicle 100 includes a navigation system 120, which guides travel routes of the vehicle 100. The navigation system 120 includes a map information database 122, which stores map information, and the navigation controller 121, which uses the map information stored in the map information database 122 to execute guiding process of travel routes of the vehicle 100.

The map information stored in the map information database 122 includes node information related to nodes, which represent positions on roads, and link information related to links, each of which connects adjacent two nodes. The node information includes positional information of nodes and road information at positions of the nodes. The link information includes road information at the positions of links. The road information included in the link information includes information representing the road load when the vehicle 100 travels through the links. In this case, the road load is defined based on the moving time, the moving speed, the consumed fuel amount, and the consumed electricity amount. The road load may be calculated based on factors such as information on the gradient of roads and the weight of the vehicle 100.

The navigation controller 121 obtains information representing the current position of the vehicle 100 from the position detecting section 101. When the user sets a destination, the navigation controller 121 searches for a travel route from a departure place of the vehicle 100 to the destination by referencing the map information database 122 and using, for example, Dijkstra's algorithm. Normally, the departure place of the vehicle 100 is the same as the current position of the vehicle 100, but may be set as a different place. The navigation controller 121 outputs, to the hybrid system controller 110 via the on-vehicle network NW, the information of all the links included in the searched travel route together with the information of the road loads included in the link information.

The vehicle 100 also includes a battery 113, which is a power source of the motor 140, and a battery actuator 112, which controls charging/discharging of the battery 113. The battery 113 can be charged by a power source located outside the vehicle, which is connected to an inlet (not shown) via the battery actuator 112. The battery actuator 112 is connected to various types of controllers such as the engine controller 130, the hybrid system controller 110, and the navigation controller 121 via the on-vehicle network NW.

The hybrid system controller 110 has a function of determining the drive force distribution (output ratio) of the engine 131 and the motor 140 at each moment. The hybrid system controller 110 has a function of performing driving assistance based on the travel route and a function of causing the vehicle 100 to travel in assigned driving modes in respective sections during traveling.

Specifically, the hybrid system controller 110 determines the drive force distribution based on the detection results of an acceleration sensor, a vehicle speed sensor, and an accelerator sensor (none of which is shown). Based on the drive force distribution, the hybrid system controller 110 generates a control command for the battery actuator 112 related to discharging of the battery 113 and information regarding the control amount of the engine 131 to be calculated by the engine controller 130. The hybrid system controller 110 determines the distribution of the braking force of the brake and the motor 140 based on the detection results of the acceleration sensor, the vehicle speed sensor, and the brake sensor. Based on the braking force distribution, the hybrid system controller 110 generates a control command for the battery actuator 112 related to charging of the battery 113 and information regarding the control amount of the brake to be calculated by the engine controller 130. The hybrid system controller 110 outputs the generated control command to the battery actuator 112 to control charging/discharging of the battery 113. Accordingly, the motor 140, which uses the battery 113 as the power source, is driven by discharge of the battery 113, or the battery 113 is charged through regeneration of the motor 140.

The hybrid system controller 110 includes the travel assisting section 150. When inputting a travel route of the vehicle 100 from the navigation controller 121, the travel assisting section 150 outputs driving assistance information in response to the input travel route. The travel assisting section 150 includes a mode planning section 151, which makes a travel plan, in which either the CD mode or the CS mode is assigned to each of the links included in the travel route input from the navigation controller 121. The unit to which either CD mode or the CS mode is assigned does not necessarily need to be the link as long as the selected unit divides a travel route into sections that correspond to the road load.

Figure 3:
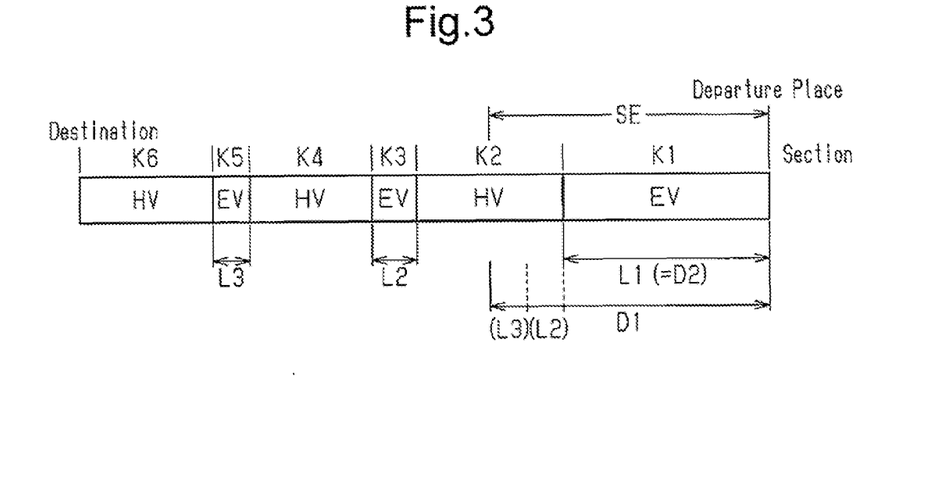
FIG. 3 is an explanatory diagram showing a method in which the vehicular information-processing device of FIG. 1 assesses the tendency of assignment of the CD mode.

As shown in FIG. 3, in a travel plan, consecutive links to which the same mode is assigned are shown as one section, for purposes of illustration. Thus, the travel plan of FIG. 3 has six sections K1 to K6 in a travel route. In the travel plan shown in FIG. 3, three sections K1, K3, K5, to which the CD mode is assigned, are labeled as EV, and three sections K2, K4, K6, to which the CS mode is assigned, are labeled as HV. EV indicates the EV mode, which corresponds to the CD mode. HV indicates the HV mode, which corresponds to the CS mode.

Specifically, the CD mode is designed to actively consume the electricity stored in the battery 113 without maintaining the charge amount and to activate the motor 140 to prioritize traveling by the motor 140. In the CD mode, the operation of the engine 131 is suppressed. However, when the accelerator pedal is depressed greatly and an increased travel power is required, the engine 131 is activated to consume fuel.

The CS mode is designed to maintain the charge amount of the battery 113 in a predetermined range in relation to a reference value and to activate the engine 131 as necessary to cause the motor 140 to perform regeneration, thereby maintaining the charge amount of the battery 113. Even in the CS mode, the motor 140 is activated and the engine 131 is stopped when the charge amount of the battery 113 exceeds the reference value. In this case, the reference value of the CS mode is set, as necessary, to a value of the charge amount of the battery 113 at the time when the CD mode is changed to the CS mode or to a value of the charge amount of the battery 113 for maintaining performance of the battery 113.

That is, the CS mode is designed to maintain the amount of charge of the battery 113 while using fuel, and the CD mode is designed to prioritize consumption of the charge amount of the battery 113 over fuel.

In either mode, the drive force distribution (output ratio) of the engine 131 and the motor 140 at each moment is determined by the hybrid system controller 110 to deal with the ever-changing road load. In accordance with the determined drive force distribution, at least one of the engine 131 and the motor 140 is driven as necessary in some cases.

The travel assisting section 150 includes a travel plan assessing section 152, which assesses the tendency of assignment of the CD mode in a travel plan. The travel plan assessing section 152 also assesses whether the magnitude of fuel efficiency improvement, which corresponds to the assessed tendency, is great or small.

Further, the travel assisting section 150 includes a mode displaying section 153, which outputs, to the HMI 123, the travel plan made by the mode planning section 151 as driving assistance information via the on-vehicle network NW. The mode displaying section 153 also outputs information regarding the magnitude of fuel efficiency improvement, which corresponds to the tendency of assignment of the CD mode by the travel plan assessing section 152. The mode displaying section 153 outputs information for displaying images at the HMI 123. In place of or in addition to this, the mode displaying section 153 may output speech information.

The HMI 123 includes a display screen, on which characters and images can be displayed, and is configured by a monitor, a head-up display, or an instrument panel. The monitor may be the monitor of the navigation system 120.

Figure 4:
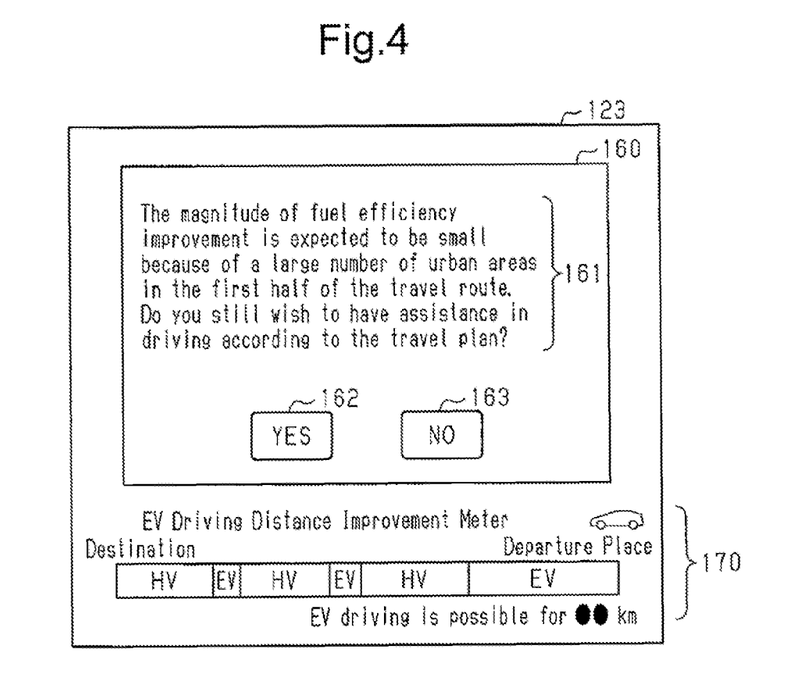
FIG. 4 shows a screen through which the vehicular information-processing device of FIG. 1 notifies that the magnitude of fuel efficiency improvement will be small in accordance with the tendency of assignment of the CD mode.

For example, as shown in FIG. 4, when inputting information related to a travel plan from the travel assisting section 150, the HMI 123 displays a meter view 170, which represents the contents of the travel plan, on the monitor or the like. The HMI 123 may output speech information input from the travel assisting section 150 via a speaker. When the magnitude of fuel efficiency improvement by the travel plan is small, the HMI 123 displays a notification view 160 of that information on the monitor or the like.

Next, an example of operation of the present embodiment will be described. Specifically, drive assisting process executed by the travel assisting section 150 will be described.

When a destination is set in the navigation system 120 and a travel route to the destination is searched for, information regarding the travel route from the departure place to the destination is input to the travel assisting section 150 from the navigation controller 121.

As the travel assisting section 150 obtains the travel route, the mode planning section 151 makes a travel plan by assigning either the CD mode or the CS mode to each link in the obtained travel route. To improve the fuel efficiency along the travel route, the mode planning section 151 plans a travel plan such that the plan meets conditions for improving the fuel efficiency. Normally, although varying in the magnitude, a travel plan achieves a certain fuel efficiency improvement in comparison to traveling not in accordance with a travel plan. Normally, if the CD mode is assigned and the EV driving is preferentially performed, fuel consumption is reduced, and the fuel efficiency is improved. In this case, the distance to which the CD mode can be assigned is restricted by the charge amount of the battery 113. Accordingly, by making a travel plan, the CD mode is assigned to as many sections as possible, and the CS mode is assigned to sections to which the CD mode cannot be assigned. Specifically, the mode planning section 151 assigns the CD mode to sections of relatively low road loads and assigns the CS mode to sections of relatively high road loads. Whether the road load of each section is high or low is determined in relation to the other sections in the travel route. Thus, the road load of each section is determined by being compared to the road loads of all the other sections in the travel route. In a travel plan, sections in an urban area, in which the average vehicle speed is low, are defined as sections of low road loads, and sections on a highway, on which the average vehicle speed is high, are defined as sections of high road loads. As long as conditions for improving the fuel efficiency are met, a travel plan may be made according to other known conditions.

As shown in FIG. 3, when a travel plan is made, the travel plan assessing section 152 executes a process for assessing the tendency of assignment of the CD mode in the travel route of the travel plan, that is, the magnitude of fuel efficiency improvement achieved in accordance with the tendency. The magnitude of fuel efficiency improvement is assessed to be greater as the fuel efficiency in traveling in accordance with a travel plan becomes higher than the fuel efficiency of traveling not in accordance with the travel plan. Also, the magnitude of fuel efficiency improvement is assessed to be smaller as the fuel efficiency in traveling in accordance with a travel plan becomes closer to the fuel efficiency of traveling not in accordance with the travel plan. The process of assessment is executed each time the mode planning section 151 makes a travel plan.

Figure 2:
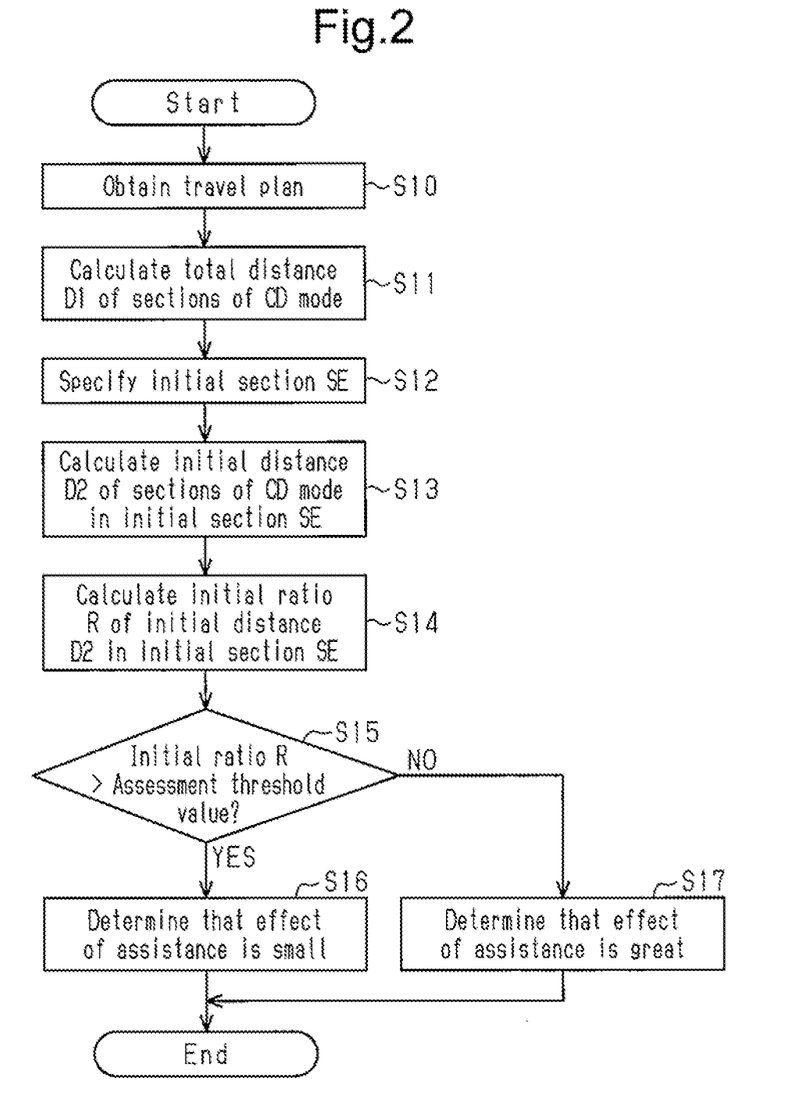
FIG. 2 is a flowchart showing a process executed by the vehicular information-processing device of FIG. 1 to assess the magnitude of fuel efficiency improvement based on the tendency of assignment of a CD mode.

That is, when the process of FIG. 2 is initiated, the travel plan assessing section 152 obtains a travel plan (step S10 of FIG. 2). The travel plan assessing section 152 calculates, as a total distance D1 (see FIG. 3), the sum of the distances of all the sections to which the CD mode is assigned in the obtained travel plan (step S11 of FIG. 2). The travel plan assessing section 152 specifies, as an initial section SE, the distance from the departure place to the position corresponding to the total distance D1 (D1=L1+L2+L3) in the travel route, as shown in FIG. 3 (step S12 of FIG. 2). The travel plan assessing section 152 calculates, as an initial distance D2 (see FIG. 3), the sum of the distances of the sections to which the CD mode is assigned in the initial section SE (step S13 of FIG. 2). In the present embodiment, the section K1 is the only section to which the CD mode is assigned in the initial section SE. Thus, the initial distance D2 is equal to the distance L1.

The travel plan assessing section 152 calculates, as an initial ratio R, the ratio of the initial distance D2 in the initial section SE, which has the same distance as the total distance D1 (step S14 of FIG. 2). That is, R=D2/D1 is calculated. In other words, the initial ratio R is calculated as the ratio of the initial distance D2, which is planned as the CD mode, to a distance that is obtained by converting the total distance D1 into the distance from the departure place (the initial section SE). The travel plan assessing section 152 assesses whether the initial ratio R is greater than an assessment threshold value, which is a predetermined ratio (step S15 of FIG. 2). That is, it is determined whether R> the assessment threshold. The assessment threshold value is a threshold for assessing whether there is a tendency of assignment of the CD mode to a large number of sections closer to the departure place in the travel route. In accordance with the tendency, it is possible to determine whether the magnitude of fuel efficiency improvement is great or not. When the initial ratio R is greater than the assessment threshold value, the CD mode is assigned to a great number of sections closer to the departure place of the travel route. This indicates that there is a small difference from a case in which no travel plan is made. In contract, when the initial ratio R is less than or equal to the assessment threshold value, the CD mode is assigned to a small number of sections closer to the departure place of the travel route. This indicates that there is a great difference from a case in which no travel plan is made. Normally, when the difference is small, the magnitude of fuel efficiency improvement is small. When the difference is great, the magnitude of fuel efficiency improvement is great. The assessment threshold value is determined based on experiments, tests, experiences, and theories, and is preferably set to a value at which the user barely notices the fuel efficiency improvement by a travel plan.

When the initial ratio R is determined to be greater than the assessment threshold value (YES at step S15 of FIG. 2), there is a tendency that the CD mode is assigned to a great number of sections closer to the departure place of the travel route. At this time, the travel plan assessing section 152 determines that traveling in accordance with the travel plan will have a small magnitude of fuel efficiency improvement. That is, the travel plan assessing section 152 determines that the effect of assistance will be small (step S16 of FIG. 2). In contrast, when the initial ratio R is determined to be less than or equal to the assessment threshold value (NO at step S15 of FIG. 2), there is a tendency that the CD mode is assigned to a small number of sections closer to the departure place of the travel route. At this time, the travel plan assessing section 152 determines that traveling in accordance with the travel plan will have a great magnitude of fuel efficiency improvement. That is, the travel plan assessing section 152 determines that the effect of assistance will be great (step S17 of FIG. 2).

The travel plan assessing section 152 terminates the process for determining the tendency of assignment of the CD mode, i.e., the magnitude of fuel efficiency improvement corresponding to the tendency.

Based on the result of the assessment of the magnitude of fuel efficiency improvement by the travel plan assessing section 152, the travel assisting section 150 notifies the magnitude of fuel efficiency improvement via the mode displaying section 153.

When the effect of assistance is determined to be small, the mode displaying section 153 outputs, to the HMI 123, information indicating that traveling of the vehicle 100 in accordance with the travel plan will result in a small magnitude of fuel efficiency improvement.

As shown in FIG. 4, the mode displaying section 153 causes the HMI 123 to display, for example, an "EV driving distance improvement meter" as the meter view 170. In the meter view 170, "EV" is displayed in the three sections K1, K3, K5, each of which includes consecutive CD modes, and "HV" is displayed in the three sections K2, K4, K6, each of which includes consecutive CS modes. Therefore, the fact is notified that the CD mode is properly assigned in the travel route compared to a case in which no travel plan is made and the CD mode is successively used from the departure place until the charge amount of the battery 113 is used up. The meter view 170 shows the distance that can be covered by the EV driving of the travel plan. Thus, compared to a traveling without a travel plan, proper assignment of the CD mode in the travel route improves a sense of reliability.

When the effect of assistance is determined to be small, the HMI 123 displays the notification view 160, which indicates that traveling of the vehicle 100 in accordance with the travel plan will result in a small magnitude of fuel efficiency improvement. The notification view 160 includes notification content 161 and select buttons 162, 163, which correspond to the notification content 161. The notification content 161 contains information that allows decision of whether to follow the travel plan. The notification content 161 is, for example, a phrase "The magnitude of fuel efficiency improvement is expected to be small because of a large number of urban areas in the first half of the travel route. Do you still wish to have assistance in driving according to the travel plan?" The notification content 161 preferably contains the reason why the magnitude of fuel efficiency improvement will be small and a question for leaving the user to decide whether or not to use driving assistance to follow a travel plan. The select buttons 162, 163 are used for selecting the answer for the question contained in the notification content 161, and the result of selection of the buttons is shown as an answer (result of decision). The select button 162 is a YES button representing a positive response, while the select button 163 is a NO button representing a negative response. The HMI 123 obtains the result of input selection and delivers it to the hybrid system controller 110, so that driving assistance according to the result of selection will be performed. That is, it is possible to leave selection of whether to drive the vehicle 100 in accordance with the travel plan to the user, who selects either one of the select buttons 162, 163 in response to the notification (guidance) prior to the traveling.

The vehicular information-processing device according to the present embodiment achieves the following advantages.

(1) The tendency of assignment of the CD mode in the travel route in the travel plan is assessed, and information corresponding to the assessed tendency of assignment of the CD mode is notified through the HMI 123. Since the CD mode is designed to improve the fuel efficiency of the vehicle 100, the tendency of assignment of the CD mode corresponds to the magnitude of fuel efficiency improvement that will be achieved by traveling in accordance with the travel plan in comparison to the fuel efficiency that will be achieved by traveling not in accordance with the travel plan. The notification of the information corresponding to the tendency of assignment of the CD mode allows the user to recognize the actual magnitude of fuel efficiency improvement that will be achieved by driving the vehicle 100 in accordance with the travel plan. Since being made prior to the travel, such notification (guidance) permits the user to decide whether or not to drive the vehicle 100 in accordance with the travel plan.

(2) The user is allowed to recognize the magnitude of fuel efficiency improvement that will be achieved if the vehicle 100 is driven in accordance with the travel plan.

(3) The fact that the magnitude of fuel efficiency improvement will be relatively small in the travel route is notified. This allows the driver to recognize the fact that driving the travel route in accordance with the travel plan will result in a small magnitude of fuel efficiency improvement.

(4) The tendency of assignment of the CD mode in the travel route is determined by whether or not the ratio of the distance of the CD mode included in the total distance D1 from the departure place is great, that is, whether or not the distance that can be travelled in the CD mode assigned to sections closer to the departure place in the travel route is long. In the vehicle 100, which can travel in the CD mode, such as a plug-in hybrid vehicle, the CD mode is selected preferentially when there is no travel plan, and the vehicle 100 is driven accordingly. Thus, the CD mode tends to be selected in sections closer to the departure place in the travel route. Thus, if, in a travel plan, the CD mode is assigned to a large number of sections closer to the departure place, it is evident that traveling in accordance with that travel plan will achieve a small magnitude of fuel efficiency improvement in comparison to traveling not in accordance with the travel plan. On the other hand, since the vehicle 100 is driven with the CD mode being preferentially selected when there is no travel plan, the charge amount of the battery 113 is relatively quickly consumed. Thus, as the vehicle 100 approaches the destination, the vehicle 100 will be less likely to be capable of traveling in the CD mode even in sections suitable for the CD mode. In contrast, if the CD mode is assigned to sections suitable for the CD mode that include sections near the destination according to the travel plan, it is likely that the CD mode will also be assigned to sections away from the departure place (closer to the destination). It is evident that traveling in accordance with the travel plan will have a greater magnitude of fuel efficiency improvement than traveling not in accordance with the travel plan. Thus, the travel plan assessing section 152 determines that the initial ratio R is the ratio of assignment of the CD mode. This allows the actual magnitude of fuel efficiency improvement to be recognized accurately.

(5) The information indicating that the magnitude of fuel efficiency improvement will be relatively small is notified when the ratio of the distance to which the CD mode is assigned in sections closer to the departure place (the initial ratio R) is greater than or equal to the assessment threshold value.

(6) The notification view 160 permits the user to select whether or not to drive the vehicle in accordance with a travel plan based on the tendency of assignment of the CD mode in the travel route. Since the notification view 160 indicates the magnitude of fuel efficiency improvement, the user can make the selection based on the magnitude of fuel efficiency improvement. Since the notification view 160 indicates that the magnitude of fuel efficiency improvement will be relatively small, the user can more properly select whether to follow the travel plan.

A vehicular information-processing device according to a second embodiment will now be described with reference to FIG. 5.

The present embodiment is different from the configuration of the first embodiment in that assessment of the tendency of assignment of the CD mode and the magnitude of fuel efficiency improvement is performed based on the travel distance estimated by the hybrid system controller from the current charge amount of the battery and the travel distance planned by the mode planning section. Except for these differences, the present embodiment is identical with the first embodiment. In the following description, differences from the first embodiment will mainly be discussed, and like or the same reference numerals are given to those components that are like or the same as the corresponding components of the first embodiment, and detailed explanations are omitted.

The travel assisting section 150, which functions as a calculating circuitry, obtains the current charge amount of the battery 113 from the battery actuator 112 and calculates, in a normal state, a meter distance D5, which is distance that can be covered by the EV driving, which will consume the obtained charge amount. The meter distance D5 is an estimate of the travel distance that is obtained from the charge amount in a simplified manner. Specifically, the meter distance D5 is calculated as a distance that can be traveled with the current charge amount if EV driving is performed under a predetermined road load. The predetermined road load may be a preset value or an average road load of the roads in the range displayed on the navigation system 120. Thus, when calculating the meter distance D5, the current charge amount of the battery 113 is taken into consideration, while the road load of the actual travel route that will be traveled by the vehicle 100 is not taken into consideration. Therefore, the accuracy of the meter distance D5 is significantly restricted and generally has a low accuracy.

As in the case of the first embodiment, the mode planning section 151 makes a travel plan when obtaining a travel route from the navigation system 120, in which a destination has been set.

Based on the meter distance D5 and the distance to which the CD mode is assigned based on the travel plan, the travel plan assessing section 152 assesses the tendency of assignment of the CD mode, that is, the magnitude of fuel efficiency improvement, which will be achieved by the travel plan. The tendency of assignment of the CD mode is obtained as the difference between the meter distance D5 and the distance to which the CD mode is assigned in the travel plan. In the vehicle 100, the longer the CD mode is, the longer the distance covered by the EV driving becomes. Accordingly, the magnitude of fuel efficiency improvement is expected to be increased. Thus, the longer the distance to which the CD mode is assigned based on the travel plan is relative to the meter distance D5, the greater the magnitude of fuel efficiency improvement is assessed to be. The closer to the meter distance D5 the distance to which the CD mode is assigned based on the travel plan is, the smaller the magnitude of fuel efficiency improvement is assessed to be. Unlike the case of the first embodiment, the travel plan assessing section 152 does not need to calculate the initial ratio R, which is the ratio of the CD mode in the initial distance D2 in the initial section SE of the travel route.

That is, the travel plan assessing section 152 executes a process for assessing the tendency of assignment of the CD mode in the travel route of the travel plan and the magnitude of fuel efficiency improvement, which corresponds to the tendency. The process of assessment is executed each time the mode planning section 151 makes a travel plan.

Figure 5:
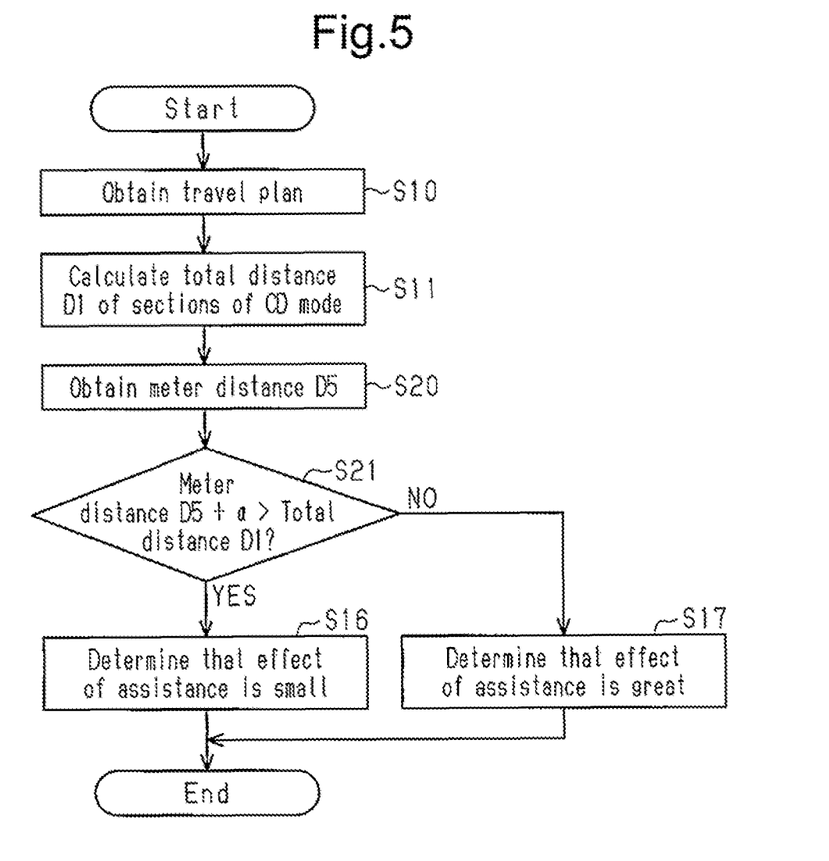
FIG. 5 is a flowchart showing a process executed by a vehicular information-processing device according to a second embodiment to assess the magnitude of fuel efficiency improvement based on the tendency of assignment of the CD mode.

As shown in FIG. 5, when the process of assessment is initiated, the travel plan assessing section 152 obtains a travel plan and calculates a total distance D1, which is the sum of the distances to which the CD mode is assigned from the obtained travel plan (Step S10, S11 of FIG. 5). The travel plan assessing section 152 obtains the meter distance D5, which has been calculated by the travel assisting section 150 (step S20 of FIG. 5). The travel plan assessing section 152 determines whether the sum of the meter distance D5 and a margin α is greater than the total distance D1 (step S21 of FIG. 5). That is, whether (D5+α)>D1 is satisfied is determined. The margin α represents a distance corresponding to an allowable error of the meter distance D5 in relation to the total distance D1. The margin α is determined based on experiments, tests, experiences, and theories, and is preferably set to a value at which the user barely notices the fuel efficiency improvement by a travel plan.

When the sum of the meter distance D5 and the margin α is assessed to be greater than the total distance D1 (YES at step S21 of FIG. 5), there is a tendency that the CD mode is assigned to a small number of sections in the travel route. Thus, the travel plan assessing section 152 determines that traveling in accordance with the travel plan will have a small magnitude of fuel efficiency improvement. That is, the travel plan assessing section 152 determines that the effect of assistance will be small (step S16 of FIG. 5). In contrast, when the sum of the meter distance D5 and the margin α is assessed to be less than or equal to the total distance D1 (NO at step S21 of FIG. 5), there is a tendency that the CD mode is assigned to a great number of sections in the travel route. Thus, at this time, the travel plan assessing section 152 determines that traveling in accordance with the travel plan will have a great magnitude of fuel efficiency improvement. That is, the travel plan assessing section 152 determines that the effect of assistance will be great (step S17 of FIG. 5).

The travel plan assessing section 152 terminates the process for assessing the tendency of assignment of the CD mode in the travel route of the travel plan and the magnitude of fuel efficiency improvement, which corresponds to the tendency.

In accordance with the result of the assessment of the magnitude of fuel efficiency improvement by the travel plan assessing section 152, the travel assisting section 150 notifies the magnitude of fuel efficiency improvement via the mode displaying section 153.

In addition to the advantages (1) to (3) and (6) of the first embodiment, the vehicular information-processing device of the present embodiment, which has been described, achieves the following advantages.

(7) The tendency of assignment of the CD mode in a travel route of a travel plan is assessed based on the difference between the meter distance D5, which is calculated by the travel assisting section 150, and the total distance D1 of all the sections to which the CD mode is assigned in the travel route of the travel plan. The meter distance D5, which is calculated based on the charge amount of the battery 113 and the predetermined road load without considering the travel route, does not generally have a high accuracy. In contrast, the total distance D1 of the CD mode, which is assigned in the travel plan, which is made by taking the travel route into consideration, inherently has a high accuracy. Therefore, a small difference between the meter distance D5 and the total distance D1 indicates that the travel plan will have a small magnitude of fuel efficiency improvement. On the contrary, a great difference indicates that the travel plan will have a great magnitude of fuel efficiency improvement. For example, the longer the total distance D1 relative to the meter distance D5 is, the greater the magnitude of fuel efficiency improvement becomes. The closer to the meter distance D5 the total distance D1 is, the smaller the magnitude of fuel efficiency improvement becomes.

(8) The information indicating that the magnitude of fuel efficiency improvement will be relatively small is notified when the difference between the meter distance D5 and the total distance D1 is less than or equal to the margin α, which is a threshold value.

The above described embodiments may be modified as follows.

In the above illustrated embodiments, the notification content 161 of text is used for notifying the fact that the magnitude of fuel efficiency improvement is small. The present disclosure is not limited to this. For example, advisability based on the magnitude of fuel efficiency improvement may be calculated, and the calculated advisability may be notified by using a number, a level indication, or a symbol. This configuration is also capable of notifying the magnitude of fuel efficiency improvement, which will be achieved by a travel plan. In accordance with the notification, whether to drive the vehicle 100 according to the travel plan can be selected.

In the above illustrated embodiments, the sum of the distance of all the sections to which the CD mode is assigned in the travel plan is defined as the total distance D1. The present disclosure is not limited to this. For example, a margin may be added to or subtracted from the total distance. The margin may be determined according to the tendency of errors caused in the total distance. The margin may be determined such that notification of the magnitude of fuel efficiency improvement is easily understood by the user.

In the above illustrated embodiments, a case in which there are a great number of urban areas in the first half of the travel route is described as a case in which the magnitude of fuel efficiency improvement is small. Not limited to this, when there are a great number of sections suitable for the EV driving in the first half of the travel route, the magnitude of fuel efficiency improvement may be assessed to be small. A section suitable for the EV driving refers to a section (for example, a link) in which the road load is relatively low among all the sections (for example, all the links) of a travel route. Generally, sections in which the road load is low and the CD mode is often selected include sections in which the vehicle speed is low, such as downhill slopes and congested sections, in addition to urban areas. Sections in which the road load is high and the CD mode is rarely selected include sections in which the vehicle speed is high, such as highways, mountain roads with many uphill slopes and downhill slopes, and curvy sections near a coast line.

In the above illustrated embodiments, when a travel plan is made, the information corresponding to the tendency of assignment of the CD mode is notified before traveling is started. Not limited to this, the information corresponding to the tendency of assignment of the CD mode may be notified after reaching the destination or while traveling on the travel route. If the notification is given after reaching the destination, the user is more likely to be satisfied with the result of the fuel efficiency on the travel route. In a case in which the magnitude of fuel efficiency improvement, which is notified when the travel plan is being made, is small, that information may be notified again. This improves a sense of reliability for the user, regarding the adequacy of the travel plan.

In the first embodiment, the travel plan assessing section 152 assesses the tendency of assignment of the CD mode as the magnitude of fuel efficiency improvement. Not limited to this, the travel plan assessing section may assess, as the magnitude of fuel efficiency improvement, the tendency of assignment of the CS mode in the initial section of the travel route or the fuel consumption amount per unit distance in the initial section. At this time, if the ratio of the distance to which the CS mode is assigned in the initial section of the travel route is small, it is determined that the magnitude of fuel efficiency improvement will be small. If the fuel consumption amount per unit distance in the initial section is small, it is determined that the magnitude of fuel efficiency improvement will be small.

In the above illustrated embodiments, the CD mode is designed to prioritize operation of the motor 140, which uses the charge amount of the battery 113, and restrain operation of an internal combustion engine. Not limited to this, the CD mode may be designed to activate an electric motor, which uses the charge amount of a battery, and prohibit operation of an internal combustion engine. In this case, when the motor cannot supply sufficient traveling power, the mode may be switched to the HV mode.

In the above illustrated embodiments, notification is made when the magnitude of fuel efficiency improvement is small. Not limited to this, notification may be made when the magnitude of fuel efficiency improvement is great. In this case, there is no need to allow the user to decide whether to activate driving assistance. Instead, the user may be notified of the fact that the magnitude of fuel efficiency improvement by the travel plan is great. This improves satisfaction of the user regarding the travel plan.

Each of the above embodiments illustrates a case in which the vehicle 100 is a plug-in hybrid vehicle. However, the vehicle may be a hybrid vehicle with an increased charge amount. The present disclosure may be applied to a case in which a travel plan is made for reducing the battery charge amount to a reference value.

The invention claimed is:

1. A vehicular information-processing device for a vehicle, which processes information of the vehicle, the vehicular information-processing device comprising:
   a controller circuitry configured to make the vehicle select one of a first mode and a second mode and travels,
   in the first mode, the controller circuitry configured to restrain or prohibit operation of an internal combustion engine, while prioritizing operation of a motor, which consumes a charge amount of a battery,
   in the second mode, the controller circuitry configured to activate at least one of the engine and the motor to maintain the charge amount of the battery,
   the controller circuitry configured to generate a travel route from a departure place to a destination including a plurality of sections,
   the controller circuitry configured to generate a travel plan assigns one of the first mode and the second mode to each of the sections, which are included in the travel route,
   the vehicular information-processing device further comprising:
   an assessing circuitry configured to assess a tendency of assignment of the first mode in the travel route, which corresponds to a magnitude of fuel efficiency improvement that will be achieved by travelling in accordance with the travel plan in comparison to the fuel efficiency of traveling for assigning the first mode in each of the sections from the departure place, wherein the assessing circuitry is configured to
   calculate a sum of distances of all the sections to which the first mode is assigned in the travel route,
   convert the sum into a distance from the departure place,
   define the converted distance as an initial section,
   in the initial section from the departure place in the travel route, define an initial distance as the distance that is planned as the first mode, and
   define a ratio of the initial distance to the initial section as the tendency; and
   a notifying device configured to notify information corresponding to the tendency assessed by the assessing circuitry to a driver of the vehicle, wherein the notifying device is configured to notify the information when the information corresponding to the tendency is information indicating that the magnitude of fuel efficiency improvement will be smaller than a predetermined value.

2. The vehicular information-processing device according to claim 1, wherein the notifying device is configured to, when the ratio is assessed to be greater than or equal to a predetermined ratio, notify information corresponding to the tendency as the information indicating that the magnitude of fuel efficiency improvement will be smaller than a predetermined value.

3. A vehicular information-processing device for a vehicle, which processes information of the vehicle, the vehicular information-processing device comprising:
a controller circuitry configured to make the vehicle select one of a first mode and a second mode and travels,
in the first mode, the controller circuitry configured to restrain or prohibit operation of an internal combustion engine, while prioritizing operation of a motor, which consumes a charge amount of a battery,
in the second mode, the controller circuitry configured to activate at least one of the engine and the motor to maintain the charge amount of the battery,
the controller circuitry configured to generate a travel route from a departure place to a destination including a plurality of sections,
the controller circuitry configured to generate a travel plan assigns one of the first mode and the second mode to each of the sections, which are included in the travel route,
the vehicular information-processing device further comprising:
an assessing circuitry configured to assess a tendency of assignment of the first mode in the travel route, which corresponds to a magnitude of fuel efficiency improvement that will be achieved by travelling in accordance with the travel plan in comparison to the fuel efficiency of traveling for assigning the first mode in each of the sections from the departure place; and
a notifying device configured to notify information corresponding to the tendency assessed by the assessing circuitry to a driver of the vehicle,
further comprising a calculating circuitry, which is configured to calculate a travel distance that is to be traveled in the first mode, wherein
the calculating circuitry is configured to calculate a travel distance that can be traveled in the first mode based on the charge amount of the battery and a predetermined road load, and
the assessing circuitry is configured to
calculate a sum of distances of all the sections to which the first mode is assigned in the travel route by the travel plan,
define the sum as a total distance, and
assess a difference between the travel distance calculated by the calculating circuitry and the total distance as the tendency,
wherein the notifying device is configured to, when the difference is assessed to be less than or equal to a predetermined threshold value, notify information corresponding to the tendency as the information indicating that the magnitude of fuel efficiency improvement will be smaller than a predetermined value.

4. The vehicular information-processing device according to claim 1, wherein the notifying device is configured to, when the information is notified, notify information usable for the driver to decide whether to cause the vehicle to travel according to the travel plan or not.

5. A vehicular information-processing method performed by a vehicular information-processing device for a vehicle, which processes information of the vehicle, the vehicular information-processing method comprising:
by a controller circuitry, making the vehicle select one of a first mode and a second mode and travels,
in the first mode, by the controller circuitry, restraining or prohibiting operation of an internal combustion engine, while prioritizing operation of a motor, which consumes a charge amount of a battery,
in the second mode, by the controller circuitry, activating at least one of the engine and the motor to maintain the charge amount of the battery,
by the controller circuitry, generating a travel route from a departure place to a destination including a plurality of sections,
by the controller circuitry, generating a travel plan assigns one of the first mode and the second mode to each of the sections, which are included in the travel route,
by an assessing circuitry, assessing a tendency of assignment of the first mode in the travel route, which corresponds to a magnitude of fuel efficiency improvement that will be achieved by travelling in accordance with the travel plan in comparison to the fuel efficiency of traveling for assigning the first mode in each of the sections from the departure place,
by the assessing circuitry,
calculating a sum of distances of all the sections to which the first mode is assigned in the travel route,
converting the sum into a distance from the departure place,
defining the converted distance as an initial section,
in the initial section from the departure place in the travel route, defining an initial distance as the distance that is planned as the first mode, and
defining a ratio of the initial distance to the initial section as the tendency; and
by a notifying device, notifying information corresponding to the tendency assessed by the assessing circuitry to a driver of the vehicle, by notifying the information when the information corresponding to the tendency is information indicating that the magnitude of fuel efficiency improvement will be smaller than a predetermined value.

6. A vehicular information-processing method performed by a vehicular information-processing device for a vehicle, which processes information of the vehicle, the vehicular information-processing method comprising:
by a controller circuitry, making the vehicle select one of a first mode and a second mode and travels,
in the first mode, by the controller circuitry, restraining or prohibiting operation of an internal combustion engine, while prioritizing operation of a motor, which consumes a charge amount of a battery,
in the second mode, by the controller circuitry, activating at least one of the engine and the motor to maintain the charge amount of the battery,
by the controller circuitry, generating a travel route from a departure place to a destination including a plurality of sections,
by the controller circuitry, generating a travel plan assigns one of the first mode and the second mode to each of the sections, which are included in the travel route,
by an assessing circuitry, assessing a tendency of assignment of the first mode in the travel route, which corresponds to a magnitude of fuel efficiency improvement that will be achieved by travelling in accordance with the travel plan in comparison to the fuel efficiency of traveling for assigning the first mode in each of the sections from the departure place; and
by a notifying device, notifying information corresponding to the tendency assessed by the assessing circuitry to a driver of the vehicle, by a calculating circuitry, calculating a travel distance that is to be traveled in the first mode, by the calculating circuitry, calculating a travel distance that can be traveled in the first mode based on the charge amount of the battery and a predetermined road load, and by the assessing circuitry, calculating a sum of distances of all the sections to which the first mode is assigned in the travel route by the travel plan, defining the sum as a total distance, and assessing a difference between the travel distance calculated by the calculating circuitry and the total distance as the tendency, by the notifying device, when the difference is assessed to be less than or equal to a predetermined threshold value, notifying information corresponding to the tendency as the information indicating that the magnitude of fuel efficiency improvement will be smaller than a predetermined value.

* * * * *